United States Patent [19]

Markos

[11] Patent Number: 4,575,146

[45] Date of Patent: Mar. 11, 1986

[54] PROTECTIVE TRUCK LINER RETAINER

[75] Inventor: Dennis A. Markos, Lincolnwood, Ill.

[73] Assignee: Penda Corporation, Portage, Wis.

[21] Appl. No.: 655,872

[22] Filed: Sep. 28, 1984

[51] Int. Cl.[4] .................................................. B62D 33/02
[52] U.S. Cl. ...................................... 296/39 R; 52/716
[58] Field of Search .............. 296/39 R; 224/42.42 R;
403/345, 339; 52/573, 242, 273, 35, 716, 717, 718

[56] References Cited

U.S. PATENT DOCUMENTS

| | | | |
|---|---|---|---|
| 3,814,473 | 6/1974 | Lorenzen, Jr. | 296/39 R |
| 4,047,749 | 9/1977 | Lambitz et al. | 296/39 R |
| 4,181,349 | 1/1980 | Nix et al. | 296/39 R |
| 4,333,678 | 6/1982 | Munoz et al. | 296/39 R |
| 4,336,963 | 6/1982 | Nix et al. | 296/39 R |
| 4,341,412 | 7/1982 | Wayne | 296/39 R |

*Primary Examiner*—Robert R. Song
*Attorney, Agent, or Firm*—Isaksen, Lathrop, Esch, Hart & Clark

[57] ABSTRACT

A protective retainer for fastening and retaining the side wall of a protective liner in a pickup truck cargo bed is disclosed which is particularly constructed to maintain the engaged liner side wall in substantial longitudinal alignment despite varying environmental conditions. The protective retainer has a fastening plate which extends longitudinally to substantially cover the side surface of the side rail of a truck cargo bed. A retainer section depends downwardly from the fastening plate. The retainer section includes inner and outer downwardly depending walls which closely engage and retain the side wall of a truck bed liner. The retainer section walls permit vertical and longitudinal movement of the liner side wall within the retainer section, but substantially prevent transverse displacement of the engaged portion of the liner side wall.

16 Claims, 4 Drawing Figures

PROTECTIVE TRUCK LINER RETAINER

FIELD OF THE INVENTION

This invention relates to truck cargo bed liners, and particularly to means for securing and retaining truck liner side walls in proper position.

DESCRIPTION OF PRIOR ART

Pickup trucks have been used for many years as working vehicles and more recently for recreational use. The metal surfaces of the cargo bed, including the side rails, are normally painted by the manufacturer. Painting these surfaces provides little protection from scratches, weathering, corrosives and least of all, from cargo impact from shifting loads. These types of injuries to the cargo bed and its side rails can seriously detract from the truck's appearance thereby drastically reducing the vehicle's worth.

To prevent or conceal such cargo bed damage, various cargo bed liners have been designed and are the subject of prior art patents. One piece liners comprising a bottom wall, a front wall, two opposing side walls and side wall flanges which fit over the cargo bed side rails are shown in U.S. Pat. No. 4,341,412 to Wayne, U.S. Pat. No. 4,336,963 to Nix, et al., U.S. Pat. No. 4,181,349 to Nix, et al., U.S. Pat. No. 4,047,749 to Lambitz, and U.S. Pat. No. 3,814,473 to Lorenze. U.S. Pat. No. 4,333,678 to Munuz, et al. shows a knock down bed liner with side wall flanges which fit over the truck rails.

Although the above-mentioned prior art devices do protect pickup truck cargo beds and side rails, such liners have some limitations.

One problem involves the dimensional stability of large one-piece plastic liners. When molding large objects of plastic such as high density polyethylene, warping and waving of the outer extents is common and consequently aesthetic qualities of the object suffer. The outer extents of such liners are also subject to distortion as a result of exposed weathering during storage and after installation. This is most obvious along the side wall flanges which cover the truck cargo bed's side rails. Such dimensional instability of the liner often prevents a precise fit of the flanges over the truck side rails, and hinders efforts to fasten the liner and side wall flanges to the cargo bed. Furthermore, such irregularities may seriously detract from the liner's appearance.

Another limitation is caused by differences in the coefficients of expansion between the metal truck bed side walls and the molded plastic cargo bed liners. As a result of the materials expanding and contracting at different rates in response to environmental temperature changes, a liner may bulge or be stretched between fasteners, thereby placing stress on the liner and the fasteners holding the liner to the truck's side rails.

A third problem that occurs is the loss of usable cargo space. A considerable amount of space is lost because the prior art side rail flanges extend over the cargo bed area. This creates a space between the cargo bed liner side walls which are inclined downwardly and inwardly from the side wall flanges, and the truck side wall.

A co-pending application of patent, U.S. Ser. No. 608,341, discloses an under-the-rail cargo bed liner that avoids or conceals from view the aesthetic and structural disadvantages of the prior art cargo bed liners discussed above. However, the advantages of the under-the-rail liner are not easily realized in truck cargo beds with single side walls or non-overhanging side rails. Conventional fasteners for the liner side walls are conspicuously visible from the outside of single side wall cargo beds. Likewise, the upper margin of the side walls of such liners, and the conventional side wall fasteners, are conspicuously visible from the inside of cargo beds without overhanging side rails.

Consequently, a need has existed for protective, dimensionally stable, cargo liner retainers which will provide an attractive appearance, facilitate use of under-the-rail cargo liners, and provide structure for retaining cargo liner side walls without stretching, buckling or significantly visible deformation under normal operating and environmental conditions.

SUMMARY OF THE INVENTION

The present invention is summarized as a protective retainer for fastening and retaining the side wall of a protective liner in a pickup truck cargo bed. The protective liner retainer has a longitudinally extending fastening plate which is adapted to substantially cover a side surface of a cargo bed side rail and be fastened thereto in fixed supporting relation. A retainer section depends generally downwardly from the fastening plate and includes an inner wall and an outer wall. The inner wall extends generally downwardly from the fastening plate, while the outer wall extends outwardly from the intersection of the fastening plate and the inner wall and then downwardly and nearly parallel to the inner wall. The inner and outer walls are adapted to closely engage and retain therebetween the upper portion of an upwardly extending cargo bed liner side wall in substantial longitudinal alignment. The inner and outer walls are further adapted to permit vertical and longitudinal movement of the liner side wall within the retainer but to substantially prevent significant transverse displacement of the upper portion of the liner side wall. The retainer fastening plate and inner wall may include one or more longitudinally extending structural ridges to provide transverse stiffness, dimensional stability and impact protection. The liner retainer may also include a bottom wall extending outwardly from the lower margin of the fastening plate to underlie the cargo bed side rail and support the retainer section beneath the side rail. The liner retainer may also include a top wall extending normally outwardly from the upper margin of the fastening plate to substantially cover and protect the upper surface of the cargo bed side rail.

It is the object of this invention to provide a dimensionally stable and attractive protective retainer for a truck cargo bed liner.

It is a further object of the invention to provide a protective retainer which will closely engage and retain the upper portion of the side wall of a protective liner within a truck cargo bed in substantial longitudinal alignment, while still permitting limited vertical and longitudinal movement but substantially preventing significant transverse displacement of the engaged portion of the side wall.

It is a further object of the invention to provide a retainer for a truck cargo bed liner which may be conveniently fastened to the readily accessible side surfaces of the truck side rails but which will retain the side walls of the liner in an outwardly displaced position beneath the truck side rails to utilize maximum cargo space within the cargo bed.

It is another object of the invention to provide a retainer which will conveniently engage and retain a protective liner in a truck cargo bed and will additionally provide protection for the truck side rails.

Other objects and features of the present invention will become apparent from the following descriptions of the preferred embodiment of this invention in conjunction with the accompanying drawings.

DESCRIPTION OF THE PREFERRED EMBODIMENT

Figure 1:
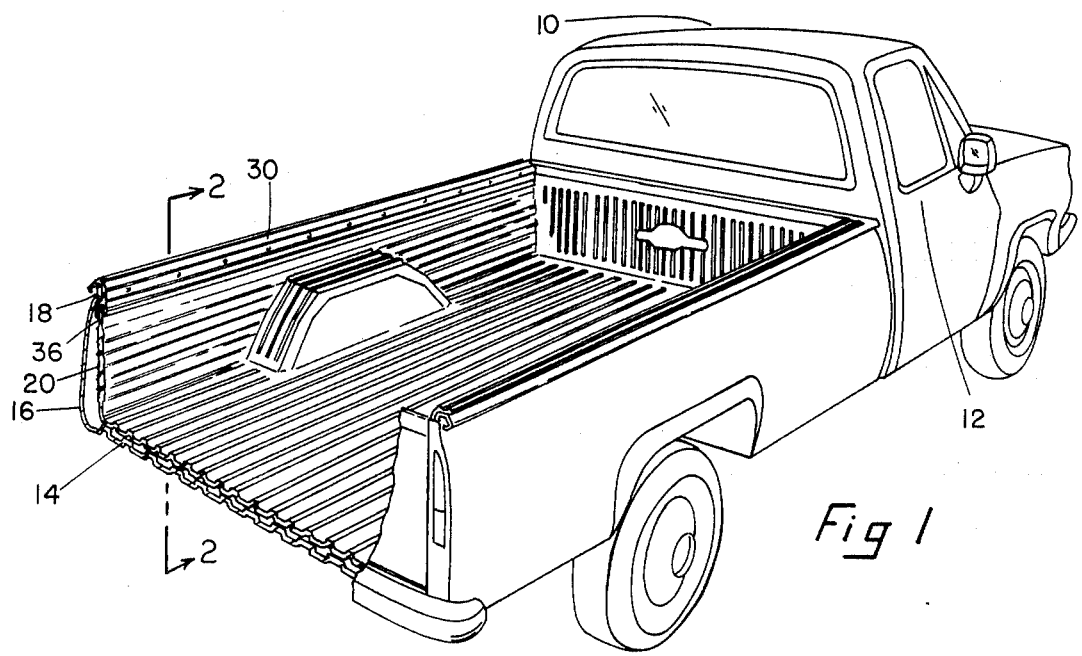
FIG. 1 is a perspective view of a protective retainer of the invention installed in combination with a cargo bed liner in a schematically illustrated pickup truck, with portions of the truck cargo bed and tailgate broken away for the purpose of illustration.

FIG. 1 illustrates a pickup truck 10 having a cab 12, cargo bed 14, cargo bed side wall 16, and cargo bed side rails 18. A preferred embodiment of the protective retainer 30 of this invention is shown in FIGS. 1 and 2 installed on the truck's side rails 18 and in retaining engagement with an under-the-rail cargo bed liner 20.

The protective liner retainer 30 is preferably formed of a high density and dimensionally stable plastic in a single, integral unit, preferably by extrusion. The retainer 30 has a longitudinally extending fastening plate 34 which is adapted to protectively cover the side surface 24 of the truck's side rail 18. The fastening plate 34 preferably has a plurality of longitudinally extending structural ridges 42 which provide transverse stiffness, dimensional stability and impact protection to the fastening plate. Equidistant between two such ridges on the fastening plate 34 is located a line of fastener holes 44 to accommodate fasteners 46 for securing the fastening plate 30 to the truck's side rails 18 in fixed, supporting relation.

The protective retainer 30 of the preferred embodiment also includes a liner retainer section 36. The liner retainer section 36 includes an inner wall 38, and an outer wall 40. The retainer section inner wall 38 may be a linear extension of the fastening plate 34, extending downwardly in approximately the same plane as the fastening plate 34, as shown in FIG. 3. The retainer section inner wall 38 may also be displaced from alignment with the fastening plate 34, as shown in FIGS. 2 and 4. The retainer section inner wall 38 may also contain one or more of the longitudinally extending structural ridges 42 to provide transverse stiffness, dimensional stability and impact protection to the inner wall 38 and to an engaged cargo bed liner side wall. The retainer section outer wall 40 extends outwardly from the area of intersection of the fastening plate 34 and the inner wall 38, and then downwardly at approximately a right angle and nearly parallel to the inner wall 38. Regardless of the particular manner of dependency of the inner and outer walls from the remainder of the protective retainer, the walls should extend in spaced relation to define a slot capable of receiving the upper portion of the cargo bed liner side wall 20. The outer wall 40 preferably extends to a point which is approximately a quarter of an inch below the inner wall 38 to facilitate insertion of the top portion of the cargo liner side wall 20 between the inner and outer walls 38 and 40.

Figure 2:
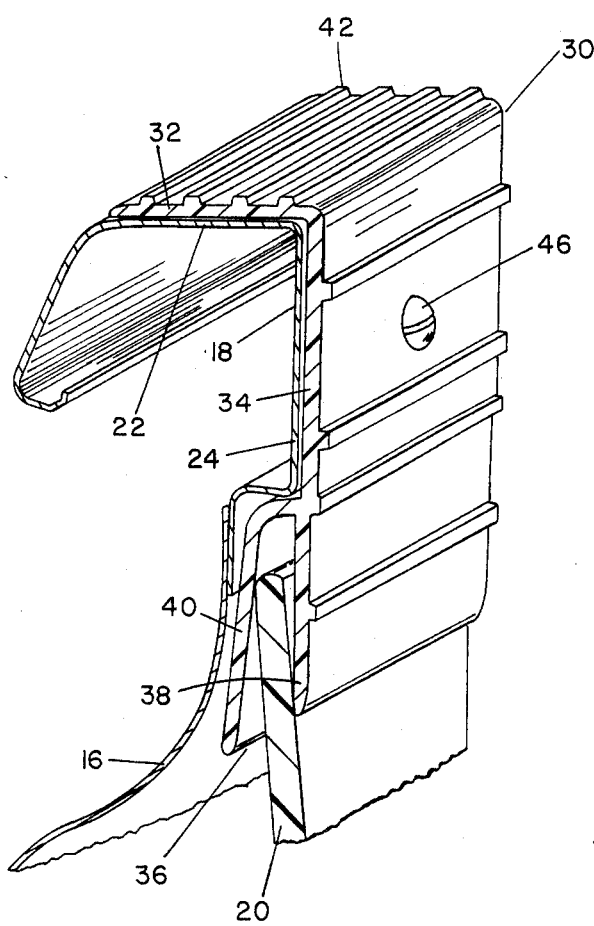
FIG. 2 is a fragmentary perspective view of the protective retainer of FIG. 1, with section surfaces lying along the line 2—2.
Figure 3:
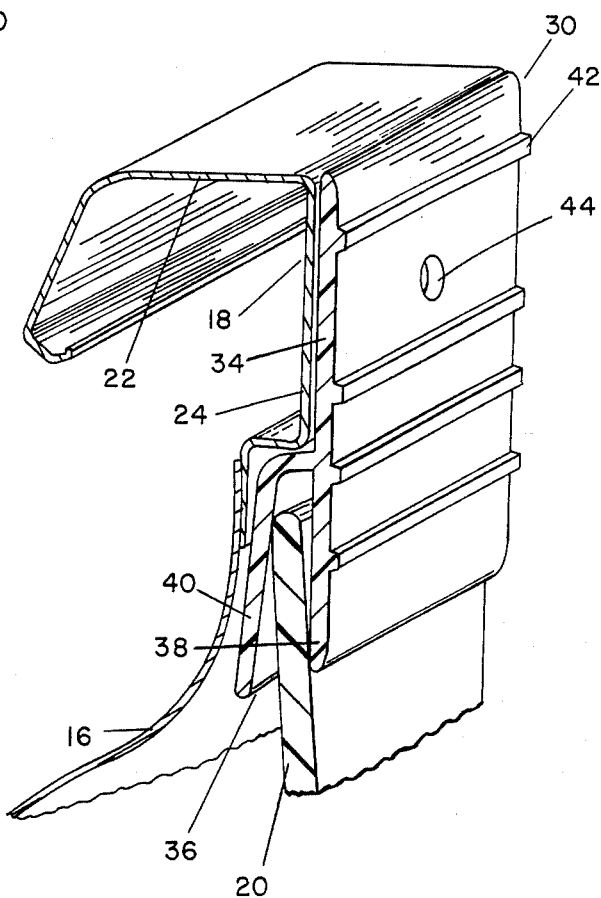
FIG. 3 is a fragmentary perspective view of another preferred embodiment of the invention with section surfaces lying along a line in the position of line 2—2 of FIG. 1.
Figure 4:
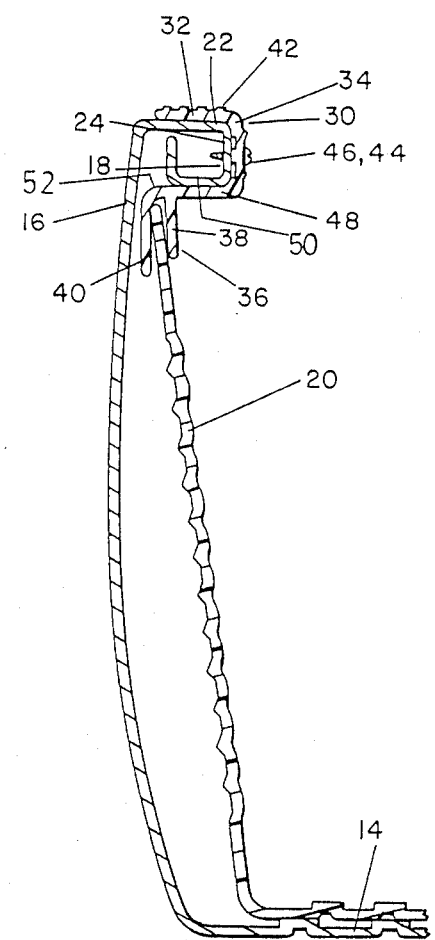
FIG. 4 is a fragmentary section view of another preferred embodiment of the invention, taken along a section line in the position of line 2—2 of FIG. 1.

As best illustrated in FIGS. 2 and 3, the inner wall 38 and outer wall 40 of the retainer section 36 are adapted to closely engage the upper portion of a cargo bed liner side wall 20 to permit limited vertical and longitudinal movement of the side wall 20 within the retainer section 36, but to substantially prevent significant transverse inward and outward displacememt of the engaged side wall 30. This "floating" engagement of the liner side wall is highly beneficial, as it permits movement of the side wall 20 within the retainer section 36 to compensate for differences in the coefficients of expansion between the metal truck cargo bed 14 and the large one-piece plastic cargo bed liner 20 in response to changing environmental conditions. At the same time, the inner wall 38 and outer wall 40 of the retainer section 36 closely constrain the engaged liner side wall 20 transversely, to prevent any substantial displacement of the engaged portion of the liner side wall inwardly or outwardly. Since the retainer section 36 extends longitudinally for substantially the full length of the truck side rail 18 and the liner side wall 20, it can be seen that the retainer section 36 will establish and maintain an engaged liner side wall in substantial longitudinal alignment. Accordingly any warping, waving or rippling of the liner side wall 30 resulting from the thermoforming and cooling process, or during storage or exposure to the environment, will be minimized when the side wall is inserted within the dimensionally stable retainer section 36. The upper margin of the side wall 30, where any transverse irregularities are most noticeable and objectionable, is effectively hidden from view within the retainer section. Close transverse restraint of the liner side wall 30 by the retainer section 36, while providing the opportunity for vertical and longitudinal expansion, permits expansion and contraction of the liner side wall 30 to be effectively channeled within the normal plane of the side wall, with transverse displacement minimized, and with no bulging or stress between the liner side wall and fasteners engaged in the metal truck cargo bed.

FIGS. 2 and 3 also effectively illustrate that the fasteners 46 which secure the protective retainer fastening plate 34 to the side surfaces 24 of the truck side rail are both highly accessible from the interior of the truck cargo bed 14, and effectively hidden from external view by the typical overhanging extended top ledge 22 of the truck side rail 18. By contrast, it can be seen that direct attachment of the liner side wall 20 to the single side wall 16 of the illustrated truck cargo bed by positive fasteners extending through the side wall 16 would be highly visible and aesthetically unacceptable to many truck owners. FIG. 2 also illustrates that the heads of the fasteners 46 are positioned between spaced structural ridges 42, which protect the heads from impact by vertical cargo surfaces, and also protect such cargo surfaces from contact by the fastener heads.

A significant advantage of the protective retainer 30 of the invention is that it provides for attachment of the side walls of a cargo bed liner to a truck cargo bed at the most convenient point on the cargo bed, the side surface 24 of the side rail 18, regardless of the side wall structure of the cargo bed. Currently, substantially all pickup truck cargo beds have side rails with side surfaces, although the truck side walls vary widely. The protective retainer 30 permits the liner manufacturer to design the liner to be engaged by a uniform protective retainer 30 fastened to the more standard cargo bed rail, rather than the cargo bed side walls which are so often varied to produce a distinctive appearance for the truck.

FIG. 3 further illustrates that the protective retainer 30 of the invention is completely compatible with the cargo bed caps or toppers (not shown) which have come into very wide usage on pickup trucks, yet may also be installed on trucks without cargo bed caps. It can be seen in FIG. 3 that the top ledge 22 of the truck rail 18 need not be covered by the protective liner retainer 30. Thus, a cargo bed cap may be readily mounted in position on the side rails 18 of a truck equipped with the protective retainer 30 of the invention, or removed therefrom, without disturbing the protective retainer 30. Nor does the protective retainer 30 interfere with or complicate installation of the cap. Conversely, the protective retainer 30 of FIG. 3 may be easily installed on the truck rails 18 after a cap has been installed without disturbing the cap in any fashion.

FIG. 2 illustrates an embodiment of the protective retainer 30 wherein a top wall 32 extends outwardly from the upper margin of the fastening plate 34 to overlie and provide a protective cover for the top ledge 22 of the truck side rail 18. The top wall may have a plurality of structural ridges 42, as shown. The top wall 32 is normally not provided when the truck has an installed cap or the truck owner intends to install a cap in the future. While a cap could be installed over the top wall 32 of the rail cover 30 of FIGS. 1 and 2, there is no particular advantage in doing so, and the top wall 32 might make installation slightly more difficult or result in a less desirable seal between the side rail 18 and cap.

FIG. 4 illustrates another protective liner retainer 30 of this invention adapted to fit pickup trucks with substantially inwardly overhanging side rails. The protective retainer 30 of FIG. 4 has a fastening plate 34 similar to the retainers of FIGS. 1 to 3, and may also have a top wall 32, if desired. The fastening plate 34 and the top wall 32 also preferably have a plurality of spaced and longitudinally extending structural ridges 42. A bottom wall 48 extends outwardly from the bottom of the fastening plate 34 and is adapted to underlie the cargo bed side rail 18 and, if present, the bottom face 50 of the side rail 18.

The protective retainer bottom wall 48 supports a retainer section 36 which is similar to the retainer section 36 of the previously described embodiments of FIGS. 1-3. The retainer section 36 includes a bottom wall extension 52 connected to the bottom wall 48 and canted downwardly therefrom at a shallow angle, preferably of between 5° and 15°. Connected to and extending normally downwardly from the inner edge of the bottom wall extension 52 is the inner wall 38 of the retainer section 36. The retainer section outer wall 38 is connected to the outer edge of the bottom wall extension 52 and extends normally downward therefrom. The retainer section 36 of FIG. 4 engages and retains the upper portion of the liner side wall 20 in close proximity to the truck side wall 16 and well beneath the substantially overhanging truck side rail 18. Such engagement maximizes permissible cargo space, while permitting relative expansion and contraction of the cargo bed liner within the cargo bed in response to environmental factors or impact, without stressing the liner 20, the protective retainer 30 or the fasteners 46. The minimal spacing between the truck side wall 16 and the wall of the liner 20 retained within the retainer section 36 is nevertheless sufficient to protect the truck side wall 16 from impact by articles being placed in, or shifting position within, the cargo bed liner. This is particularly important with single wall cargo bodies common to lightweight foreign-made pickup trucks, since such walls are easily dented by internal impacts to the great detriment of the external appearance of the truck. It has been found that under-the-rail cargo bed liners 20 retained in place with the protective liner retainers of the invention effectively eliminate the need for after-market-installed auxiliary steel inner side walls for such single wall truck cargo bodies.

The design of the protective liner retainer 30 of this invention combined with an under-the-rail cargo bed liner 20 has several advantages over the one-piece combination cargo bed liner and side rail cover revealed in the prior art. First, the protective retainer 30 of this invention is of a size and dimensional relation that it may be made of polyvinyl chloride or "vinyl". Vinyls are dimensionally stable and aesthetically attractive, and may be extruded or molded into linear shapes which will closely retain their form and sight line under widely varying environmental conditions and temperatures. For example, vinyl has become a preferred building material for protective and decorative applications such as residential siding, where warping or other dimensional or aesthetic deterioration from weather or sunlight would be unacceptable. These dimensionally stable qualities allow the protective retainer 30 to closely conform to the line of the truck's side rail 18, and to retain such close conformation and uniform sight lines under substantially all environmental conditions. This is important to acceptability of protective retainers and truck body liners in today's marketplace, where appearance is an increasingly important concern to pickup owners and manufacturers. While vinyl has been previously used for decorative and protective rail covers for truck side rails, such rail covers have not incorporated any structure for engaging or retaining cargo bed liner side walls as disclosed and claimed herein. The invention permits the use of attractive vinyl material on the most visible portion of the pickup truck cargo body, the rails, in the form of vinyl protective retainers which structurally engage and retain efficient and durable cargo bed liners formed from high density polyethylene preferred for strength, toughness and impact resistance. Alternatively, the protective retainers of the invention may be formed of extruded aluminum or other metal, or from other plastics having suitable dimensional stability and strength.

It is understood that this invention is not confined to the particular construction and arrangement of parts herein illustrated and described, but embraces such modified forms thereof as come within the scope of the following claims.

I claim:

1. A protective retainer for fastening and retaining the side wall of a protective liner in a pickup truck cargo bed having side rails with side surfaces facing the interior of the cargo bed area, comprising:

(a) a longitudinally extending fastening plate adapted to substantially cover a side surface of a cargo bed side rail and be fastened thereto in fixed supporting relation;

(b) a retainer section depending generally downwardly from the fastening plate, the retainer section including an inner wall extending downwardly from the fastening plate and an outer wall extending outwardly from the area of intersection of the fastening plate and the inner wall and then extending downwardly and nearly parallel to the inner wall, the inner and outer walls of the retainer section being adapted to closely engage and retain therebetween the upper portion of a cargo bed liner side wall in substantially longitudinal alignment, the inner and outer walls permitting vertical and longitudinal movement of the liner side wall within the retainer section but substantially preventing significant transverse displacement of the upper portion of the liner side wall.

2. The protective retainer specified in claim 1 including a plurality of longitudinally extending structural ridges lying on the inner face of the fastening plate to provide transverse stiffness, dimensional stability and impact protection, and a surface on the inner face of the fastening plate between the ridges adapted to seat fasteners for attaching the fastening plate to the truck side rail in a recessed position between the ridges.

3. The protective retainer specified in claim 1, including at least one longitudinally extending structural ridge on the inner face of the retainer section inner wall to provide lateral stiffness, dimensional stability and impact protection.

4. The protective retainer specified in claim 1, including a top wall which extends normally outwardly from the upper margin of the fastening plate and is adapted to substantially cover the upper surface of the truck cargo bed side rail.

5. A protective retainer as recited in claim 1, wherein the protective retainer is formed of extruded vinyl plastic.

6. A protective retainer for fastening and retaining the side wall of a protective liner in a pickup truck cargo bed having side rails with side surfaces facing the interior of the cargo bed area, comprising:

(a) a longitudinally extending fastening plate adapted to substantially cover a side surface of a truck cargo bed side rail in protective relation and be fastened thereto in fixed supporting relation;

(b) a bottom wall connected to and extending normally outwardly from the fastening plate and adapted to underlie the truck cargo bed side rail;

(c) a retainer section including an inner wall extending generally downwardly from the bottom wall, a bottom wall extension of the bottom wall extending outwardly beyond the intersection of the inner wall, and an outer wall extending approximately normally downwardly from the bottom wall extension and approximately parallel to the inner wall, the inner and outer walls of the retainer section being adapted to closely engage the upper portion of a cargo bed liner side wall beneath the cargo bed side rail in substantial longitudinal alignment, the inner and outer walls permitting vertical and longitudinal movement of the liner side wall but substantially preventing significant transverse displacement of the upper portion of the side wall.

7. The protective retainer specified in claim 6, wherein the fastening plate includes a plurality of elongated structural ridges thereon to provide transverse stiffness, dimensional stability and impact protection, and a surface on the inner face of the fastening plate between the ridges adapted to seat fasteners for attaching the fastening plate to the truck side rail in a recessed position between the ridges.

8. The protective retainer specified in claim 6, wherein the bottom wall extension is canted downwardly from the plane of the bottom wall at a shallow angle, and wherein the inner and outer walls extend downwardly approximately normal to the bottom wall extension.

9. The protective retainer specified in claim 6, including at least one longitudinally extending structural ridge on the inner face of the retainer section inner wall to provide lateral stiffness, dimensional stability and impact protection.

10. The protective retainer specified in claim 6, including a top wall which extends normally outwardly from the upper margin of the fastening plate and is adapted to substantially cover the upper surface of the truck cargo bed side rail.

11. A protective retainer as recited in claim 6, wherein the protective retainer is formed of extruded vinyl plastic.

12. In combination, a cargo bed liner and a protective liner retainer adapted to fit within a pickup truck cargo area having side walls topped by side rails with side surfaces facing the interior of the cargo area, comprising:

(a) a cargo bed liner having a pair of opposed side walls adapted to be positioned within te truck cargo bed wherein each side wall is in close proximity to one of the truck cargo bed side walls, the upper portions of the liner side walls terminating beneath the truck side rails; and (b) a pair of protective liner retainers each having an elongated fastening plate adapted to be fastened to and substantially cover the side surface of a truck cargo bed side rail, and each having a downwardly extending cargo bed liner retainer section, the retainer section having an inner wall and an outer wall which are disposed downwardly from the fastening plate in closely opposed relation and are adapted to engage and retain therebetween the upper margin of a cargo bed liner side wall in vertically and longitudinally moveable relation but to substantially prevent significant transverse displacement of the engaged portions of the liner side wall.

13. The combination specified in claim 12, including a plurality of longitudinally extending structural ridges lying on the inner face of the fastening plate to provide transverse stiffness, dimensional stability and impact protection, and a surface on the inner face of the fastening plate between the ridges adapted to seat fasteners for attaching the fastening plate to the truck side rail in a recessed position between the ridges.

14. The combination specified in claim 12, including at least one longitudinally extending structural ridge on the inner face of the retainer section inner wall to provide lateral stiffness, dimensional stability and impact protection.

15. The combination specified in claim 12, including a top wall which extends normally outwardly from the upper margin of the fastening plate and is adapted to substantially cover the upper surface of the truck cargo bed side rail.

16. The combination specified in claim 12, wherein the protective retainer is formed of extruded vinyl plastic.

* * * * *